(12) United States Patent
Srinivasan et al.

(10) Patent No.: US 10,984,042 B2
(45) Date of Patent: Apr. 20, 2021

(54) PUBLISHING RDF QUADS AS RELATIONAL VIEWS

(71) Applicant: Oracle International Corporation, Redwood Shores, CA (US)

(72) Inventors: Jagannathan Srinivasan, Nashua, NH (US); Jayanta Banerjee, Nashua, NH (US); Vinh Thi Kim Nguyen, Fairborn, OH (US)

(73) Assignee: Oracle International Corporation, Redwood Shores, CA (US)

( * ) Notice: Subject to any disclaimer, the term of this patent is extended or adjusted under 35 U.S.C. 154(b) by 564 days.

(21) Appl. No.: 15/652,044

(22) Filed: Jul. 17, 2017

(65) Prior Publication Data
US 2017/0316110 A1 Nov. 2, 2017

Related U.S. Application Data

(63) Continuation of application No. 13/753,329, filed on Jan. 29, 2013, now Pat. No. 9,710,568.

(51) Int. Cl.
G06F 16/80 (2019.01)
G06F 16/951 (2019.01)
G06F 16/9535 (2019.01)

(52) U.S. Cl.
CPC ............ *G06F 16/80* (2019.01); *G06F 16/951* (2019.01); *G06F 16/9535* (2019.01)

(58) Field of Classification Search
CPC ..... G06F 16/80; G06F 16/9535; G06F 16/951
See application file for complete search history.

(56) References Cited

U.S. PATENT DOCUMENTS 7,328,209 B2  2/2008  Das et al.
7,680,862 B2  3/2010  Chong
(Continued)

OTHER PUBLICATIONS

Gibson et al., Application of Named Graphs Towards Custom Provenance Views, Feb. 23, 2009, Pacific Northwest National Laboratory, 1st Workshop on the Theory and Practice of Provenance, http://wiki.esi.ac.Uk/w/files/4/49/Gibson.pdf.*
(Continued)

*Primary Examiner* — Alford W Kindred
*Assistant Examiner* — Lin Lin M Htay
(74) *Attorney, Agent, or Firm* — Vista IP Law Group, LLP

(57) ABSTRACT

A method, system, and computer program product for transforming RDF quads to relational views. The method commences by receiving a named graph, the named graph comprising at least one RDF quad, and analyzing the named graph to produce analysis metadata. The method uses the analysis metadata to generate relational views. The method further comprises publishing a relational view in the form of a SPARQL query. The quality of the results can be quantitatively measured and reported by calculating a goodness score based at least in part on aspects of the relational view definitions. Several variants for transformation include generating relational view definitions formed using a named-graph strict variant, or a named-graph relaxed variant, or a named-graph agnostic variant. The transformations can form outputs responsive to characteristics or properties such as a number of classes, a number of single-valued properties, a number of nullability properties, or a number of type-uniformed ranges.

20 Claims, 11 Drawing Sheets

(56) References Cited

U.S. PATENT DOCUMENTS

| | | | |
|---|---|---|---|
| 7,818,352 | B2 | 10/2010 | Krishnamoorthy et al. |
| 7,979,455 | B2 | 7/2011 | Krishnamoorthy et al. |
| 8,037,008 | B2 | 10/2011 | Jung et al. |
| 8,140,556 | B2 | 3/2012 | Rao et al. |
| 8,204,856 | B2 | 6/2012 | Meyer et al. |
| 8,285,748 | B2 | 10/2012 | Thomas et al. |
| 8,484,233 | B2 | 7/2013 | Xie et al. |
| 8,719,252 | B2 | 5/2014 | Miranker |
| 8,949,225 | B2 | 2/2015 | Wu et al. |
| 8,972,405 | B1 | 3/2015 | Chaulk |
| 2004/0015470 | A1* | 1/2004 | Smith ............... G06F 16/21 |
| 2004/0236767 | A1 | 11/2004 | Soylemez et al. |
| 2006/0235823 | A1 | 10/2006 | Chong |
| 2007/0038609 | A1 | 2/2007 | Wu |
| 2007/0038658 | A1 | 2/2007 | Ghosh |
| 2007/0276197 | A1 | 11/2007 | Harmon |
| 2008/0104032 | A1 | 5/2008 | Sarkar |
| 2008/0126397 | A1 | 5/2008 | Alexander |
| 2009/0012842 | A1 | 1/2009 | Srinivasan et al. |
| 2009/0106234 | A1 | 4/2009 | Siedlecki et al. |
| 2009/0138437 | A1 | 5/2009 | Krishnamoorthy et al. |
| 2009/0138498 | A1 | 5/2009 | Krishnamoorthy et al. |
| 2010/0049763 | A1 | 2/2010 | Jung et al. |
| 2010/0106729 | A1* | 4/2010 | Pan ............... G06F 16/951 707/747 |
| 2010/0124216 | A1 | 5/2010 | Ku |
| 2010/0165947 | A1 | 7/2010 | Taniuchi et al. |
| 2010/0185643 | A1 | 7/2010 | Rao et al. |
| 2010/0241644 | A1 | 9/2010 | Jackson et al. |
| 2010/0281053 | A1 | 11/2010 | Braines et al. |
| 2011/0040717 | A1* | 2/2011 | Rho ............... G06F 16/951 706/50 |
| 2011/0047178 | A1 | 2/2011 | Song |
| 2011/0113072 | A1 | 5/2011 | Lee et al. |
| 2012/0102022 | A1 | 4/2012 | Miranker et al. |
| 2012/0102050 | A1* | 4/2012 | Button ............... G06N 5/043 707/749 |
| 2012/0102472 | A1 | 4/2012 | Wu et al. |
| 2012/0166446 | A1 | 6/2012 | Bowman et al. |
| 2012/0179644 | A1 | 7/2012 | Miranker |
| 2012/0271860 | A1 | 10/2012 | Graham et al. |
| 2012/0303668 | A1 | 11/2012 | Srinivasan et al. |
| 2013/0262443 | A1 | 10/2013 | Leida et al. |
| 2013/0318070 | A1 | 11/2013 | Wu et al. |
| 2013/0329723 | A1 | 12/2013 | Ku |
| 2013/0332473 | A1 | 12/2013 | Ryman |
| 2014/0025694 | A1 | 1/2014 | Ryman |
| 2014/0156643 | A1 | 6/2014 | Rais-Ghasem |
| 2014/0201234 | A1 | 7/2014 | Lee |
| 2014/0214857 | A1 | 7/2014 | Srinivasan et al. |
| 2014/0304251 | A1 | 10/2014 | Bornea |
| 2015/0205880 | A1 | 7/2015 | Perry et al. |
| 2015/0310129 | A1 | 10/2015 | Ushijima |

OTHER PUBLICATIONS

Oracle OLAP Application Developer's Guide, Oracle OLAP, Dec. 2003, Oracle Corporation, Part No. B10333-02, Pertinent pp. 1,37, 49, 132, 146, 360; https://web.stanford.edu/dept/itss/docs/oracle/10g/olap/101/b10333.pdf.*
SSWS (The 7th International Workshop on Scalable Semantic Web Knowledge Base Systems, Oct. 24, 2011, 10th International Semantic Web Conference). http://iswc2011 .semanticweb.org/fileadmin/iswc/Papers/Workshops/SSWS/SSWS2011 -Proceedings.pdf.*
Microsoft, "Expression (Database Engine)", SQL Server 2008 R2, 2008, 2 pages.
Technology and Society domain, "Named Graphs", Semantic Web Interest Group, Jan. 17, 2008, 5 pages.
W3C, "SPARQL Query Language for RDF", Jan. 15, 2008, 2 pages.
Non-final Office Action dated Jul. 31, 2014 for related U.S. Appl. No. 13/753,329.
Non-final Office Action dated Mar. 3, 2015 for related U.S. Appl. No. 13/753,329.
Oracle OLAP Application Developer's Guide, Oracle OLAP, Dec. 2003, Oracle Corporation, Part No. B10333-02, Pertinent pp. 1, 37, 49, 132, 146, 360; http://web/stanford.edu/dept/itss/docs/oracle/10g/olap.101/b10333.pdf.
Cyganiak, "A Relational Algebra for SPARQL," Sep. 28, 2005, Hewlett-Packard Development Company, L.P., HP-2005-170, http://www.hpl.hp.com/techreports/2005/HPL-2005-170.pdf.
Final Office Action dated Sep. 25, 2015 for related U.S. Appl. No. 13/753,329.
Non-final Office Action dated May 19, 2016 for related U.S. Appl. No. 13/753,329.
SSWS (The 7th International Workshop on Scalable Semantic Web Knowledge Base Systems, Oct. 24, 2011, 10th International Semantic Web Conference). Http://iswc2011.sematicweb.org/fileadmin/iswc/Papers/Workshops/SSWS/SSWS2011-Proceedings.pdf.
Sparqlify Wiki, "Comparison with R2RML" Oct. 30, 2012, 3 pages, url: http://sparqlify.org/wiki/Comparison_with_R2RML.
"1 Oracle Database Semantic Technologies Overview" Oracle Database Semantic Technologies Developer's Guide, 11g Release 2 (11.2), Part No. E25609-03, May 25, 2012, 38 pages.
"Oracle Semantic Technologies Developer's Guide" Oracle Database, 11g Release (11.1), B28397-05, Jul. 2009, 112 pages.
SPARQL 1.1 Query Language W3C, W3C Recommendation Mar. 21, 2013, 89 pages.
Droop et al.. "Translating XPath Queries into SPARQL Queries", OTM 2007 Workshops, Part I, LNCS 4805, pp. 9-10, 2007 Springer-Verlag Berlin Heidelberg, 2007.
Gregory A. Silver, Osama Al-Haj Hassan and John A. Miller, University of Georgia, "From Domain Ontologies to Modeling ontologies to Exwcutable Simulation Models", Proceedings of the 2007 Winter Simulation Conference, Dec. 9-12, 2007, (pp. 1108-1117).
Jong-Hoon Lee; Jung-Tae Kim; Hoon-Ki Lee; Eui-Hyun Paik, "Design and implementation of the Geo-Context Engine for semantic social media service", Published in: Internet Technology and Secured Transactions (ICITST), 2011 International Conference for Date of Conference: Dec. 11-14, 2011, pp. 383-387.
L. Ding et al. "TWC LOGD: A Portal for Linked Open Government Data Ecosystems", The Jounal of Web Semenatics, vol. 9, Issue 3, Sep. 2011, pp. 325-333.
"Semantic Web Activity", 2011, W3C, 5 pages, url: http://www.w3.prg/2001/sw/.
"RDF/XML Syntax Specification (Revised)", W3C Recommendation, W3C, Feb. 10, 2004, 33 pages, url: http://www.w3.org/TR/REC-rdf-syntax/.
"RDF Primer", W3C Recommendation, W3C, Feb. 10, 2004, 55 pages, url: http://www.w3.org/TR/rdf-primer/.
"SPARQL Query Language for RDF", W3C Recommendation, W3C, Jan. 15, 2008, 90 pages, url: http://www.w3.org/TR/rdf-sparql-query/.
"Apache Jena", The Apache Software Foundation, Version 2.0, Dec. 2011, 2 pages, url: http://jena.sourceforge.net/.
"openRDF.org", home of Sesame, Aduna, 1997-2012, 1 page, url: http://www.openrdf.org/.
"SPARQL Protocol for RDF", W3C Recommendation, W3C, Jan. 15, 2008, 19 pages, url: http://www.w3.org/TR/rdf-sparql-protocol/.
"RDF Semantics", W3C Recommendation, W3C, Feb. 10, 2004, 55 pages, url: http://www.w3.org/TR/rdf-mt/.
"Software Downloads", Oracle, May 14, 2011, 3 pages, url: http://www.oracle.com/technology/software/tech/semantic.sub.--technologies/index.html.
"Linked Data, Connect Distributed Data across the Web", May 1, 2011, 1 page, url: http://linkeddata.org/.
"Oracle Business Intelligence Enterprise Edition Plus", Oracle, Aug. 3, 2010, 2 pages, url: http://www.oracle.com/technetwork/middleware/bi-enterprise-edition/overvi-ew/index.html.
"Oracle Database 11g Release 2 Semantic Technologies Using the Jena Adaptor for Oracle Databse", Sep. 2009, 24 pages, url: http://download.oracle.com/otndocs/tech/semantic.sub.--web/pdf/semtech11g-r2.sub.--jenaadapt-tl.pdf.
Non-final Office Action dated Nov. 6, 2015 for related U.S. Appl. No. 14/159,702.

(56) References Cited

OTHER PUBLICATIONS

Final Office Action dated Apr. 14, 2016 for related U.S. Appl. No. 14/159,702.
Non-final Office Action dated Nov. 4, 2016 for related U.S. Appl. No. 14/159,702.
Reinwald et al., "Heterogeneous Query Processing Through SQL Table Functions," Data Engineering, 1999. Proceedings, 15th International Conference on Year: 1999, pp. 366-373.
Final Office Action dated Nov. 28, 2016 for related U.S. Appl. No. 13/753,329.
Notice of Allowance and Fee(s) due dated Feb. 23, 2017 for related U.S. Appl. No. 13/753,329.
Ramanujam et al., "Bi-directional Translation of Relational Data into Virtual RDF Stores" Dec. 1, 2010, IEEE 4th International Conference on Semantic Computing, ICSC, pp. 1-9.
Final Office Action dated May 17, 2017 for related U.S. Appl. No. 14/159,702.
Notice of Allowance and Fee(s) due dated Jul. 25, 2017 for related U.S. Appl. No. 14/159,702.

* cited by examiner

US 10,984,042 B2

PUBLISHING RDF QUADS AS RELATIONAL VIEWS

CROSS REFERENCE TO RELATED APPLICATIONS

This Application is a continuation of U.S. patent application Ser. No. 13/753,329 entitled "PUBLISHING RDF QUADS AS RELATIONAL VIEWS" and filed on Jan. 29, 2013. Certain aspects in some embodiments of the present application are related to material disclosed in U.S. patent application Ser. No. 13/114,965, entitled "METHOD AND SYSTEM FOR PRESENTING RDF DATA AS A SET OF RELATIONAL VIEWS" filed on May 24, 2011, the content of which is incorporated by reference in its entirety in this Application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of relational database systems and more particularly to techniques for publishing RDF quads as relational views.

BACKGROUND

Some embodiments of the present disclosure are directed to an improved approach for implementing transforming RDF quads to relational views.

The area of relational database (RDB) to resource description framework (RDF) transformations has seen significant activity in recent years. This includes the formation of a W3C working group, other standards body activities, and the appearance of several product announcements touting the availability of such RDB to RDF transformations. Unfortunately, the reverse transformation, namely RDF to RDB, has not been the focus of such activities. The aforementioned RDB to RDF transformations do not have the capabilities to perform RDF to RDB transformations (e.g., transforming RDF quads to relational database views). Therefore, there is a need for technologies to perform RDF to RDB transformations.

SUMMARY

The present disclosure provides an improved method, system, and computer program product suited to address the aforementioned issues with legacy approaches. More specifically, the present disclosure provides a detailed description of techniques used in methods, systems, and computer program products for transforming RDF quads to relational views.

Disclosed herein are methods, systems, and computer program product implementations for transforming RDF quads to relational views. The method commences by receiving a named graph, the named graph comprising at least one RDF quad, and analyzing the named graph with a view to producing analysis metadata. The method uses the analysis metadata to generate relational views. The method can further comprise publishing a relational view in the form of a SPARQL query. The quality of the results can be quantitatively measured and reported by calculating a goodness score based at least in part on aspects of the relational view definitions. Several variants for transformation include generating relational view definitions formed using a named-graph strict variant, or a named-graph relaxed variant, or a named-graph agnostic variant. The transformations can form outputs responsive to characteristics or properties such as a number of classes, a number of single-valued properties, a number of nullable properties, or a number of type-uniformed ranges.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
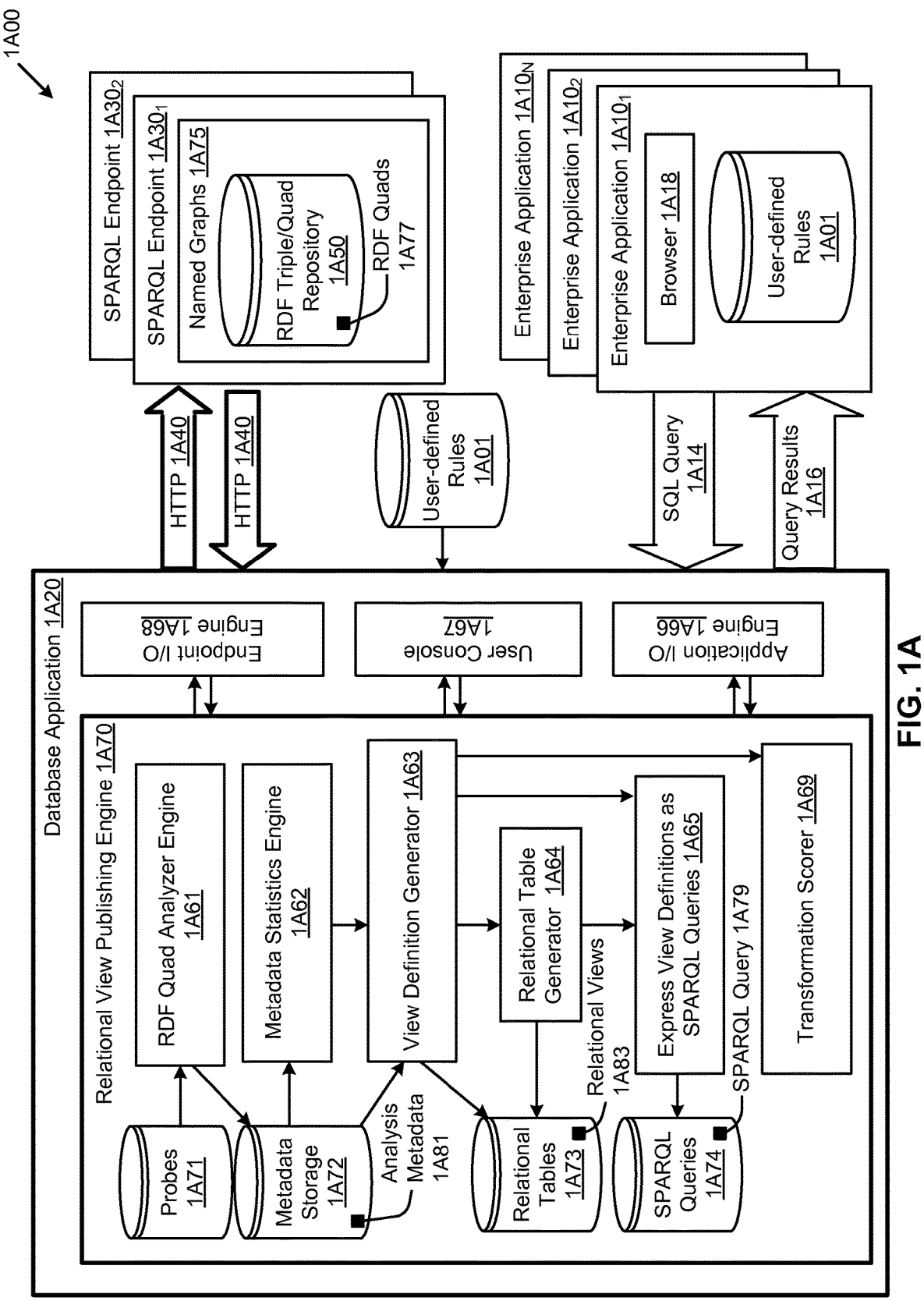
FIG. 1A exemplifies an environment for transforming RDF quads to relational views, according to some embodiments.

Some embodiments of the present disclosure are directed to approaches for implementing transforming RDF quads to relational views. More particularly, disclosed herein are exemplary environments, methods, and systems.

Overview

Described herein-below and in the accompanying figures are scalable methods and apparatus for implementing transforming RDF quads to relational views.

Motivation

The capabilities to perform RDF to RDB transformations are needed for many reasons, and find utility for at least the following reasons:

- An RDF to RDB transformation allows existing RDBMS tools to be used to analyze RDF data (e.g., for querying, data mining, business analytics). In some of the disclosed embodiments, RDF data is made available as a set of relational views and tables.
- In certain cases, an RDF to RDB relational view supports materialized tables, and thereby speeds up SPARQL query execution on RDF data. In particular, certain popular relational DBMS applications provide native RDF storage, query and differencing support, such that those applications can leverage any existing views of materialized tables to speed up SPARQL query processing.

Formal Problem Statement

The problem of generating equivalent relational view definitions to cover RDF data can be formulated as a mini-max optimization problem, where the mini-max optimization objective function includes a metric to find the set of widest possible horizontal relational tables, which on one hand maximizes the cover (that is, the number of triples that get mapped), and on the other hand minimizes the occurrence of undesired effects. Undesired effects include (but are not limited to) the number of resulting tables, the occurrence of NULLs in the resulting tables, and other undesired effects.

One technique adopts a heuristic approach, which analyzes schema found in a given RDF dataset and then derives the domain and ranges of properties. This heuristic approach exhibits distinguishing features and variants as found in the following exemplary embodiments:

- Embodiments herein address the problems attendant to publishing relational views over quads (e.g., native RDF quads or RDF quads as reformulated from RDF triples) by taking into account the presence of a fourth graph component.
- Embodiments herein define and support view variants: named graph aware (strict NS, and relaxed NR), and a named graph agnostic (NA).
- Such view variants can be used as needed to support various user demands as are discussed infra.
- Embodiments herein support two view variants that are orthogonal as pertaining to the resulting values returned (e.g., lexical or ID-based values). The ID-based views can improve the performance when the analysis primarily involves aggregate queries.
- Embodiments herein support a "goodness" score to assess the applicability and quality of transformations. Transformations can be measured by "transformation factors". For example, a transformation factor might indicate the fraction of an original dataset that gets mapped, or a transformation factor might assess the extent of NULLs present in the relational views resulting from the transformations.
- Embodiments herein support augmenting existing RDF data (e.g., existing meaning prior to transformation) by allowing the specification of user-defined rules which can then form the basis of inferences in order to synthesize additional data.

Definitions

Some of the terms used in this description are defined below for easy reference. Some of the terms used in this description refer to examples described infra, and some of examples described infra refer to the terms used in these definitions. The presented terms and their respective definitions are not rigidly restricted to these definitions—a term may be further defined by the term's use in within this disclosure.

The term "logic" means any combination of software or hardware that is used to implement all or part of the embodiments of the present disclosure.

A "module" includes any mix of any portions of computer memory and any extent of circuitry including hard-wired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The term "RDF" refers to the "resource description framework (RDF) language". The resource description framework (RDF) language is a technology that is used extensively in implementations of the "semantic web".

The term SPARQL (pronounced "sparkle") refers to a protocol using the RDF query language that is designed as a query language for databases. SPARQL is intended to federate certain uses of RDF, and SPARQL became an official "World Wide Web Consortium" (W3C) recommendation in 2008. Database engines that process queries coded in SPARQL are able to retrieve and manipulate data stored in the resource description framework format.

The term "cell" refers to a column-value within a row of a relational table or view.

The term "RDF quad dataset" refers to a set of non-empty RDF graphs.

The term "named graph" refers to a technique for representing contextual information in an RDF dataset (DS). An RDF dataset is a set of triples of the form (s, p, o), where s refers to subject, p to predicate, and o to object. The subject and predicate can be a URI, whereas the object can be a URI, blank node, or literals. An RDF quad further qualifies the triple by adding the named graph g, which represents context, provenance or any additional information. The fourth component g can be specified as a URI. By convention, all RDF quads that share the same fourth component can be viewed to form a single named graph, thus RDF quad dataset can be viewed as a collection of one or more named graphs. Note that the special case where the fourth component is not specified is also treated as a named graph with the fourth component being blank (NULL).

The term "publishing scope" refers to a particular approach for a class instance assertion. For example, considering that an RDF dataset may contain a single named graph or multiple named graphs, several approaches are herein-disclosed for use in scoping the class instance assertion, that is, assertion of the form (s rdf:type c g). If a single instance is described (e.g., has properties asserted) in multiple named graphs, the class instance property may be asserted in one or more of the named graphs where it occurs. It is also possible that a data publisher may want to assert a class instance within a designated named graph, and assert its properties in other named graphs. To support these approaches, certain embodiments consider three restriction levels in publishing RDF data with regard to the scope of class assertion in named graphs:

The scope of class assertions in an RDF dataset can be restricted to a single named graph (Named graph Strict, NS); or The scope of class assertions can be restricted to the entire dataset (Named graph Relaxed, NR); or The scope of class assertions pertaining to a named graph component can be ignored (see Named graph Agnostic, NA, as discussed below).

The term "publishable class" or "publishable classes" refers to a class and all its instances that are to be mapped to a relational view and its rows. The publishing approach as discussed herein relies on the rdf:type assertion to classify instance triples into views. Given an RDF dataset DS, the set of publishable classes that have at least one instance asserted are collected. For example, two classes :Person and :musicalArtist can be identified in NS, NR, and NA. By this definition, all the classes defined or inferred in the schema level that do not have any instance assertion are to be excluded.

The term "domain" refers to a property that determines the views where the property will be mapped to. A domain may be asserted by the property rdfs:domain, or a domain can be derived from the instance triples. The domain asserted for a property p can be identified by existence of triple of the form (p rdfs:domain c, g). Similarly, a domain inferred for a property p could be identified by existence of forms such as (s, p, o, g) and (s, rdf:type, o, g). The domain of a property is obtained as the union of domain asserted and domain inferred. For the three cases, the domain for a property would differ based on which named graph the class instance assertion property is asserted. Strictly as an example, for the property :classOf in the example of this paragraph, the domain for the three cases NS, NR, and NA are { }, {:Person}, and {:Person} respectively. The property :classOf is described in the examples (see FIG. 3A) (:Bush, :classOf, :yale_1968). This case does not have domain in NS mode because the triple (:Bush, rdf:type, :Person) is not strictly asserted in the same graph :yaleds. However, in relax mode (NR), the triple is asserted in another graph :dbpedia and hence, :Person is a domain of :classOf. Similarly, in agnostic mode (NA), since the graph component is ignored, the presence of class instance assertion in a dataset suffices and hence :Person is a domain of :classOf.

The term "range" refers to a property that determines the data type of the column to which the property will be mapped to. A range may be asserted by the property rdfs:range, or be derived from the instance triples. The range asserted (AR) for a property is determined by presence of triple of the (p, rdfs:range, r, g) whereas the range derived (DR) for a property is determined by the presence of triple of the form (s, p, o, g), with range r being the type of literal o. The overall range of a property is the union of range asserted and range derived. The property :dob in the example has the typed literal, xsd:date, as range. Its responding column may be cast to the corresponding data type of date.

The term "publishable properties" is defined as follows: All properties which have domain c make up the publishable properties for class c. The domain itself being determined differently for each scope, namely NS, NR, and NA as covered earlier. A column may be nullable or non-nullable, single-valued or multi-valued. A column mapped from a nullable property may contain NULL values. A multi-valued property is mapped to a separate property view. The nullability and multi-valuedness of a property per class are consistent across named graphs.

The term "nullability" is defined as follows: The property p of domain c is said to be nullable if it may not have a value for an instance of class c, where an instance of class c is determined appropriately for each scope, NS, NR, and NA as discussed earlier. For example, class :Person is the domain of :dob property and it has three instances (:dbpedia, :Merkel), (:dbpedia, :Bush), and (:dbpedia, :Nena) as discussed in the examples herein (see FIG. 3A-FIG. 3C). Considering that :Bush has :dob information, but :Merkel does not, :dob property is called a nullable property for class :Person. A property may be nullable for a class, but it may not be nullable for other classes. For example, :dob is nullable for class :Person but not for class :MusicalArtist. This is because the class :MusicalArtist has only one instance :Nena and :Nena has property :dob.

The term "multi-valuedness" is defined as follows: A property may be single-valued or multi-valued for a class depending upon the number of occurrences of this property per asserted instance of the class. A property is multi-valued for a class if it occurs more than once with at least one asserted instance of the class. The property :artistOf is multi-valued for class :MusicalArtist since the artist :Nena is the artist of multiple albums (Cover Me, Chokmah) in the graph :dbpedia (see FIG. 3A, 3B or 3C).

The term "single-valuedness" is defined as follows: A property is single-valued for a class if it occurs at most once for any asserted instance of the class. For example, property :name is single-valued for class :Person in the graph :dbpedia for any restriction level RL.

The term "view definition" is defined as follows: A relational view can be defined for a class by gathering all the property values of each instance into one row. All the property values for each class instance can be matched with a graph pattern that contains all the properties identified for the class. The number of resulting columns in a view depends on the number of properties in the graph pattern of its class. Such a relational view of a class provides a complete structural snapshot of that class. Besides giving the relational structure of data, the relational view should also provide the context of the data, such as provenance or version of the data. To include the context in the relational views, some embodiments collect the named graph component where each instance and its property values are matched in the graph pattern. As a result, the named graph component is mapped to a single-valued column in the view. In the embodiments discussed herein, views are classified into two types:

a class view for each class and its single-valued properties, and a multi-valued property view for each pair of class and its multi-valued property.

The term "class view" is understood as follows: Based on the restriction level (NS, NR, or NA), determine the class instance assertions in the appropriate scope. The class instances form the rows (tuples) of the view, where each tuple is of the form (g, s, and object values for all single value properties for the subject s occurring in graph g). In case of NA, the class view omits the first column corresponding to g. If all ranges of a property are consistently of a single typed literal (or are compatible to a single underlying data type), the property values are cast to an appropriate data type in the view. Otherwise, the string data type is used to accommodate all values in the same column. For example, given that class :Person, three views (SL_Person, RL_Person, AL_Person) can be created for class :Person as illustrated in the examples. Property views can be defined for multi-valued properties. A multi-valued property view captures triples corresponding to only one property.

The term "multi-valued property view" is understood as follows: Similar to class views, a property view is based on the restriction level (NS, NR, or NA). For example, it is possible to determine the class instance assertions in the appropriate scope namely in the particular graph g for NS, or in the entire dataset for NR and NA. The class instances form the rows (tuples) of the view, where each tuple is of the form (g, s, and one object value of the multi-valued property for the subject s occurring in graph g). In case of NA, the class view omits the first column corresponding to g.

The term "goodness factor" or "goodness factors" (plural form) refers to a factor or factors that are used to calculate the goodness score of view definitions, specifically transformation factors and NULL presence. A particular case of a goodness factor is a "transformation factor". As an example, while generating views, an objective function might be defined to maximize the coverage (e.g., to provide a complete snapshot of class information). To measure such view coverage, a transformation factor calculates the percentage of RDF quads in the original dataset that are covered in the view. Given the set of views generated for the specified restriction level, a reverse transformation (e.g., REL2RDF) is used to obtain the quads corresponding to each view. That is, each cell with value o in the view is transformed (g, s, p, o), where s is the subject of the row, g the graph column, and p corresponds to the column for the cell. The union of quads from all the views is subtracted from the original dataset to determine which quads are not mapped from the original dataset. The transformation factor is computed as the count of (quads in data set minus quads not mapped) over the total number of quads in the dataset. The aforementioned method can be applied to ensure that any extra derived quads in the view, which are not present in the original dataset, are excluded from coverage.

The term "NULL presence factor" is defined as follows: For each published view the count of NULLs over the total number of cells in the view gives the NULL presence factor for the view. The overall NULL presence factor is the total number of NULLS present in all published views for a restriction level over a total number of cells in all published views.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A exemplifies an environment 1A00 for transforming RDF quads to relational views. As an option, the present environment 1A00 may be implemented in the context of the architecture and functionality of the embodiments described herein. Also, the environment 1A00 or any aspect therein may be implemented in any desired environment.

As shown, FIG. 1A depicts an application (e.g., enterprise application $1A10_1$, enterprise application $1A10_2$, enterprise application $1A10_N$, etc.) in communication with a database engine 1A20 via a query (e.g., SQL query 1A14). The database engine processes the query and returns results of the query (e.g., query results 1A16) to the requesting application. The results of the query are viewed in a graphical user interface (e.g., browser 1A18) or other interface as may be used by the application. Further, a query (e.g., SQL query 1A14) can be regarded as data belonging to the application, and any extent or forms of queries or other user data can be stored in a persistent storage accessible to the application.

Execution of a query and the presentation of the returned query results for processing and display by the requesting entity provides a rich environment for a wide range of applications that rely on some forms of database storage. Yet such processing can be extended to access RDF data (e.g., after being transformed into relational data as described herein), and such extensions offer further capabilities of the heretofore-described database environment.

Inasmuch as the herein-disclosed techniques serve for publishing RDF quads as relational views, the environment 1A00 includes various forms of SPARQL processing. As shown, environment 1A00 includes access to SPARQL endpoints (e.g., SPARQL endpoint $1A30_1$, SPARQL endpoint $1A30_2$, etc.). More particularly in the embodiment of FIG. 1, the specific technique used for submitting SPARQL queries and retrieving SPARQL endpoint query results is via the HTTP protocol (see HTTP communications 1A40). Of course, communications following the protocol of HTTP can be bi-directional (as shown) and the content of the communications over HTTP can be defined a priori, for example by a covering specification. In exemplary cases an application might not be aware of any particular techniques used for submitting SPARQL queries and retrieving SPARQL endpoint query results is via the HTTP protocol, and in such cases an endpoint I/O engine 1A68 serves to manage the communication between database engine 1A20 and a standard-compliant SPARQL endpoint.

Having access to RDF data then, a relational view publishing engine 1A70 facilitates many transformations and supports many use models. Disclosed herein are schemes for publishing RDF quads (named graph datasets) as a set of relational views using the functional models of the relational view publishing engine 1A70. As shown, the relational view publishing engine 1A70 includes components in the form of an RDF quad analyzer engine 1A61, a metadata statistics engine 1A62, a view definition generator 1A63, a relational table generator 1A64, and a module to express view definitions as SPARQL queries 1A65.

The aforementioned components of the relational view publishing engine 1A70 can be arranged in juxtapositions other than as shown. Further, the specific names and storage mechanisms shown are purely illustrative. Strictly as an example, the RDF quad analyzer engine 1A61 accesses a database of probes 1A71, which probes can come in the form of standard SPARQL queries. The results of the RDF quad analyzer engine 1A61 can be stored in a persistent storage such as metadata storage 1A72, which in turn is made directly accessible to the metadata statistics engine 1A62 and the view definition generator 1A63. Having generated the view definitions, a relational table generator 1A64 can populate tables with data retrieved from the SPARQL endpoints—using the generated views—and store the populated tables in a database of relational tables 1A73. The view definitions can be published as SPARQL queries into a repository of SPARQL queries (e.g., of SPARQL query database 1A74), which in turn can be accessed by the enterprise applications (e.g., possibly through an application I/O engine 1A66). The quality or goodness or other factors based on quantitative metrics can be calculated (e.g., see transformation scorer 1A69), and the quality or goodness or other factors can be published as well.

Figure 1B:
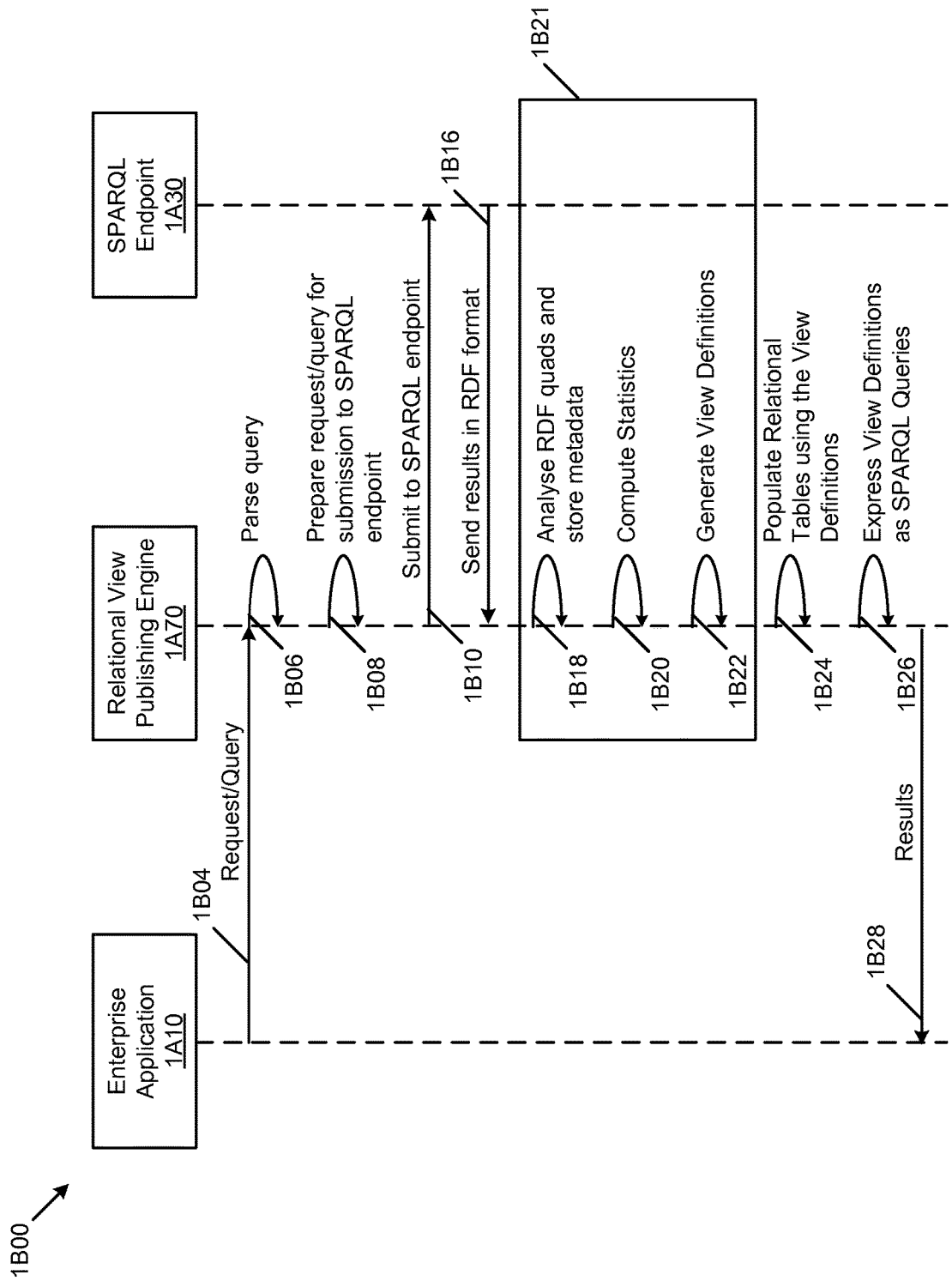
FIG. 1B depicts a protocol to implement aspects of a system for transforming RDF quads to relational views, according to some embodiments.

In the context of the computing environment of FIG. 1B, a computer implemented method for transforming RDF quads to relational views can be practiced by receiving a named graph 1A75, where the named graph comprises at least one RDF quad 1A77, then analyzing the named graph (e.g., using one or more instances of a SPARQL query 1A79 to produce analysis metadata 1A81, as shown. Then, in turn, using the analysis metadata to generate one or more relational views definition (e.g., relational view 1A83) transformed from the named graph. Having generated a view definition, the computer implemented method then publishes the relational view definition in the form of one or more instances of a SPARQL query, which SPARQL query(ies) can be used by enterprise applications accessing SPARQL endpoints.

The communication between an enterprise application and a SPARQL endpoint through a publishing engine can follow a convenient protocol, which protocol is discussed briefly below.

FIG. 1B depicts a protocol 1B00 to implement aspects of a system for transforming RDF quads to relational views. As an option, the present protocol 1B00 may be implemented in the context of the architecture and functionality of the embodiments described herein. Also, the protocol 1B00 or any aspect therein may be implemented in any desired environment.

As shown, the protocol commences when an enterprise application 1A10 submits a request (see message 1B04) to database engine 1A20, which database engine 1A20 may comprise a relational view publishing engine 1A70. The nature of the request (see message 1B04) may precipitate additional messaging and operations. For example, the request may be processed by a relational view publishing engine 1A70, which can parse the query (e.g., see operation 1B06) and perform any needed operations (see operation 1B08) so as to submit the request to a SPARQL endpoint (see operation 1B10). The SPARQL endpoint 1A30 in turn processes the SPARQL query against the RDF triple/quad repository 1A50 and returns the results in the form of RDF quads (see operation 1B16) to the caller.

At this point in the protocol, the relational view publishing engine 1A70 has received RDF quads and commences to analyze the received RDF quads (see operation 1B18). Also at this point in the protocol, the relational view publishing engine 1A70 and/or its components (e.g., an RDF quad analyzer engine 1A61) serves to identify the set of classes and properties by querying the received RDF dataset(s). In accordance with the definitions above, the RDF datasets comprise named graphs associated with its unique resource identifier (URI). In this embodiment, the names are mapped to URIs and the names are then processed so as to become column and view names. Exemplary name mapping schemes handle the limitation of length for identifiers in the database. For example:

Let n be the allowed identifier length, then the naming function can generate a name that is less than or equal to n characters that satisfies:
  2 characters (NS/NR/NA) for view variant.
  1 character (L/I) for view type: L for lexical-based; and I for ID-based view.
  3 characters for a prefix: for example AAI for "http://yaleds/".

To generate a readable name from the URI, the remaining portion is truncated to fit to (n-5) characters for view names, or (n-3) for column names.

One approach for transforming RDF quads to relational views takes into account the following design guidelines:
  First, the relational views should be compact and attempt to maximize coverage and minimize NULLs.
  Second, to make it easy for existing relational analytical tools to work, fast aggregate queries on the views should be supported.
  Third, the design should be generic so it can be used to publish relational views for any RDF quad datasets accessible via a SPARQL endpoint.

The process of transforming RDF data to relational views consists of the following steps:
  1. Generate metadata (see operation 1B18): This step performs the analysis on the RDF dataset to identify the publishable classes, properties, and property attributes (domain, range, nullability and multi-valuedness).
  2. Compute statistics (see operation 1B20): This step provides statistical insights about metadata generated from the previous steps. In some cases a user can interface via the user console 1A67, which interface allows the user to decide whether to generate all views or a subset of views.
  3. Generate view definitions (see operation 1B22): The metadata of classes and properties from previous steps is used in the view generation process. This step can be further divided into the following sub-steps: First, all single-valued properties of a class are mapped to columns of a class view. Second, each pair of class and its multi-valued property (e.g., {class, property}) is mapped to a separate multi-valued property. Third, the nullability of a property per class is used for reducing the number of OPTIONAL clauses in the graph pattern that forms the basis for computing column values for the view. Lastly, if the property ranges of instances of a class are uniform, that is, a single typed literal, the property value can be cast to an appropriate column data type in the view.

Having the generated views (see at least transforming operations 1B21), the system can populate relational tables using the view definitions. In this exemplary embodiment, the relational view publishing engine 1A70 may employ one or more components (e.g., relational table generator 1A64) to transform views onto relational tables (see operation 1B24) and thus populate relational tables in accordance with the generated view definitions.

The protocol continues by expressing the view definitions as SPARQL definitions (see operation 1B26). The results sought by the application are returned to the application (see message 1B28).

Strictly as an optional step, the relational view publishing engine 1A70 can compute a goodness score. As earlier indicated, a module such as a transformation scorer 1A69 serves to compute factors that assess the goodness of the transformation, namely:

- A quantitative transformation factor describes the ratio of the number of transformed quads over the total number of quads.
- The NULL presence factor provides the ratio of NULL values present in the resulting views.

Now, the process of transforming RDF data to relational views can make use of a transformation hierarchy that serves to formalize the segregation of the various types of views that can be published for RDF quads. Such types of views are briefly discussed herein below.

Figure 2:
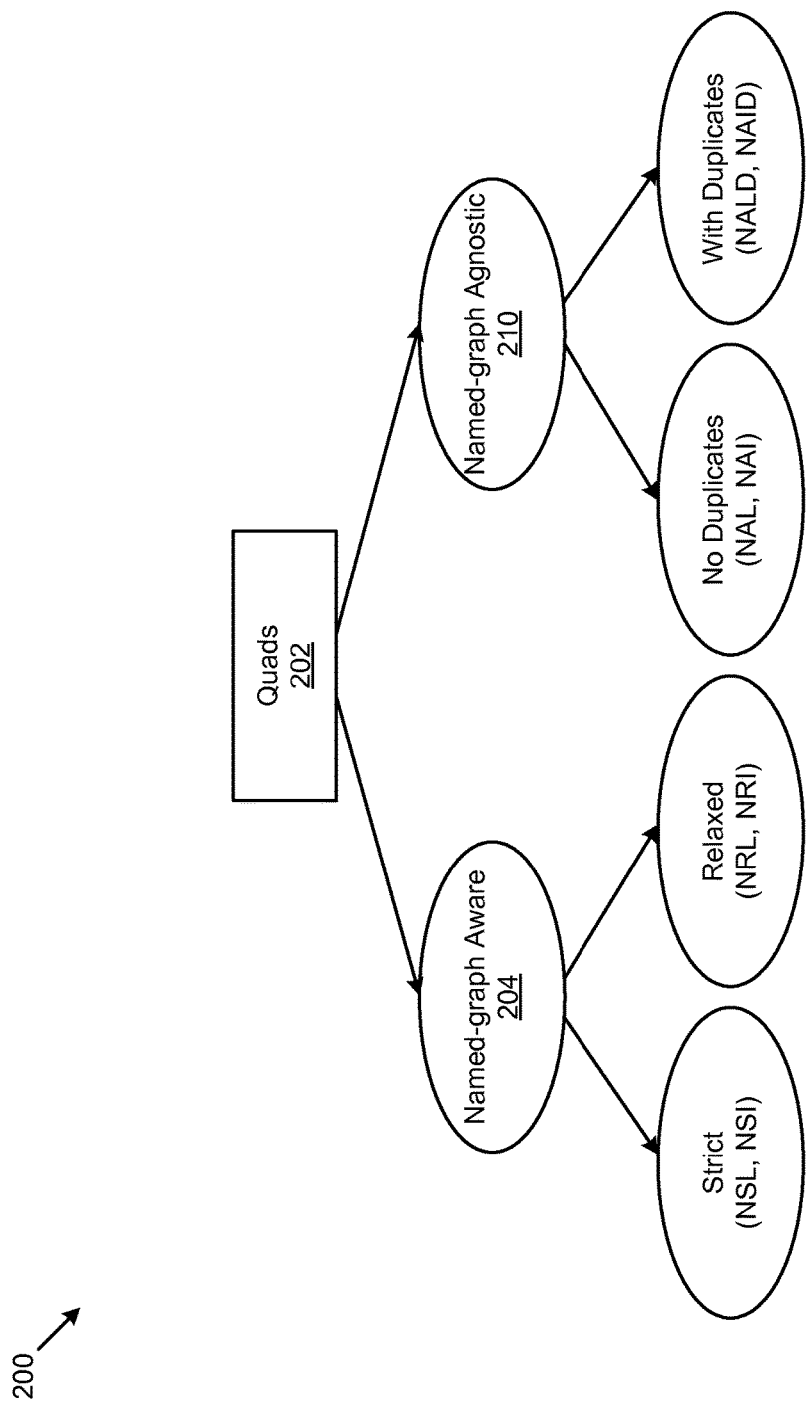
FIG. 2 is a diagram of a transformation hierarchy used in systems for transforming RDF quads to relational views, according to some embodiments.

FIG. 2 is a diagram of a transformation hierarchy 200 used in systems for transforming RDF quads to relational views. As an option, the present transformation hierarchy 200 may be implemented in the context of the architecture and functionality of the embodiments described herein. Also, the transformation hierarchy 200 or any aspect therein may be implemented in any desired environment.

Given an RDF quad input 202, the transformation hierarchy provides for transformation into a named-graph aware view 204 or into a named-graph agnostic view 210. Selecting one branch or another depends on various factors such as design constraint for compactness, flatness, and fidelity of the output vis-á-vis the input, and other factors (as is discussed below). Moreover, even given the hierarchy just described, there is another level, the leaf level that provides further bifurcation. As shown, the named-graph aware view 204 can be further divided into a "strict form" (NSL, NSI) or a "relaxed form" (NRL, NRI). The named-graph agnostic view 210 can be further divided into a form without duplicates (NAL, NAI) or a form with duplicates (NALD, NAID). These forms are now briefly discussed.

The NRL formulation provides the maximum information. That is, using the NRL form, it can be known with precision which property values are described in which graph. Thus, for versioned datasets, where the graph component identifies the version, it is useful in determining when (that is, in which graph) a particular property was asserted for a subject. The NAL formulation provides the most compact representation, but the graph aspect is lost during the transformation. The NSL formulation might be used when a versioned dataset or any portion of provenance-based data is considered and the usage needs to view data within a single graph.

For certain cases, when properties are asserted for a subject without its rdf:type assertion, it is possible that the user specifies one or more user-defined rules 1A01 that can describe the derivation of the rdf:type assertion for subjects having (for example) a particular group of properties. Thus, by pre-entailment and/or by using user-defined rules, the RDF quad dataset can be augmented, which can in turn be published as a set of relational views.

Figure 3A:
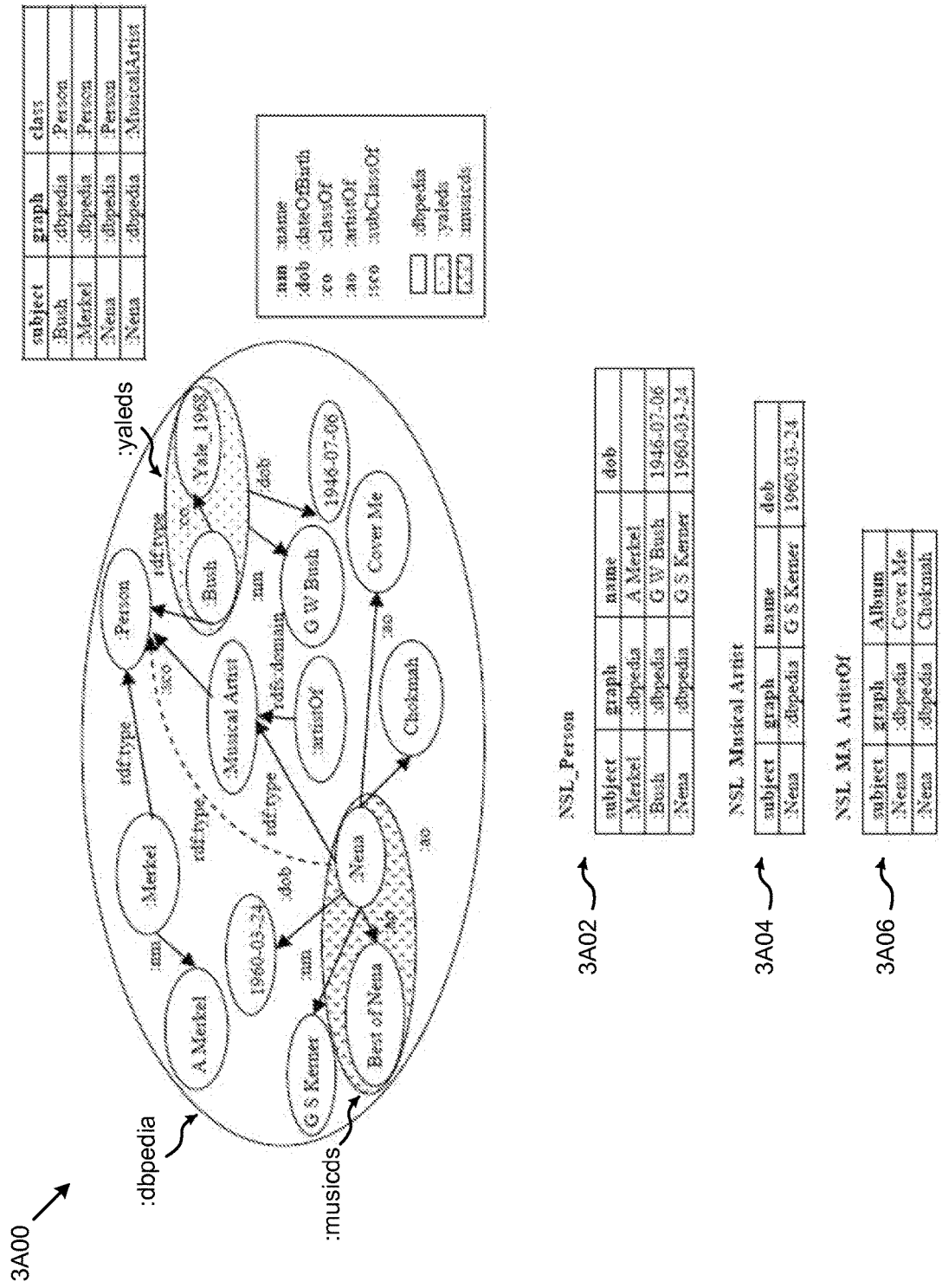
FIG. 3A is a diagram of a named graph aware strict variant transformation used in certain implementations for transforming RDF quads to relational views, according to some embodiments.

FIG. 3A is a diagram of a named graph aware strict variant transformation 3A00 used in certain implementations for transforming RDF quads to relational views. As an option, the present named graph aware strict variant transformation 3A00 may be implemented in the context of the architecture and functionality of the embodiments described herein. Also, the named graph aware strict variant transformation 3A00 or any aspect therein may be implemented in any desired environment.

Figure 3B:
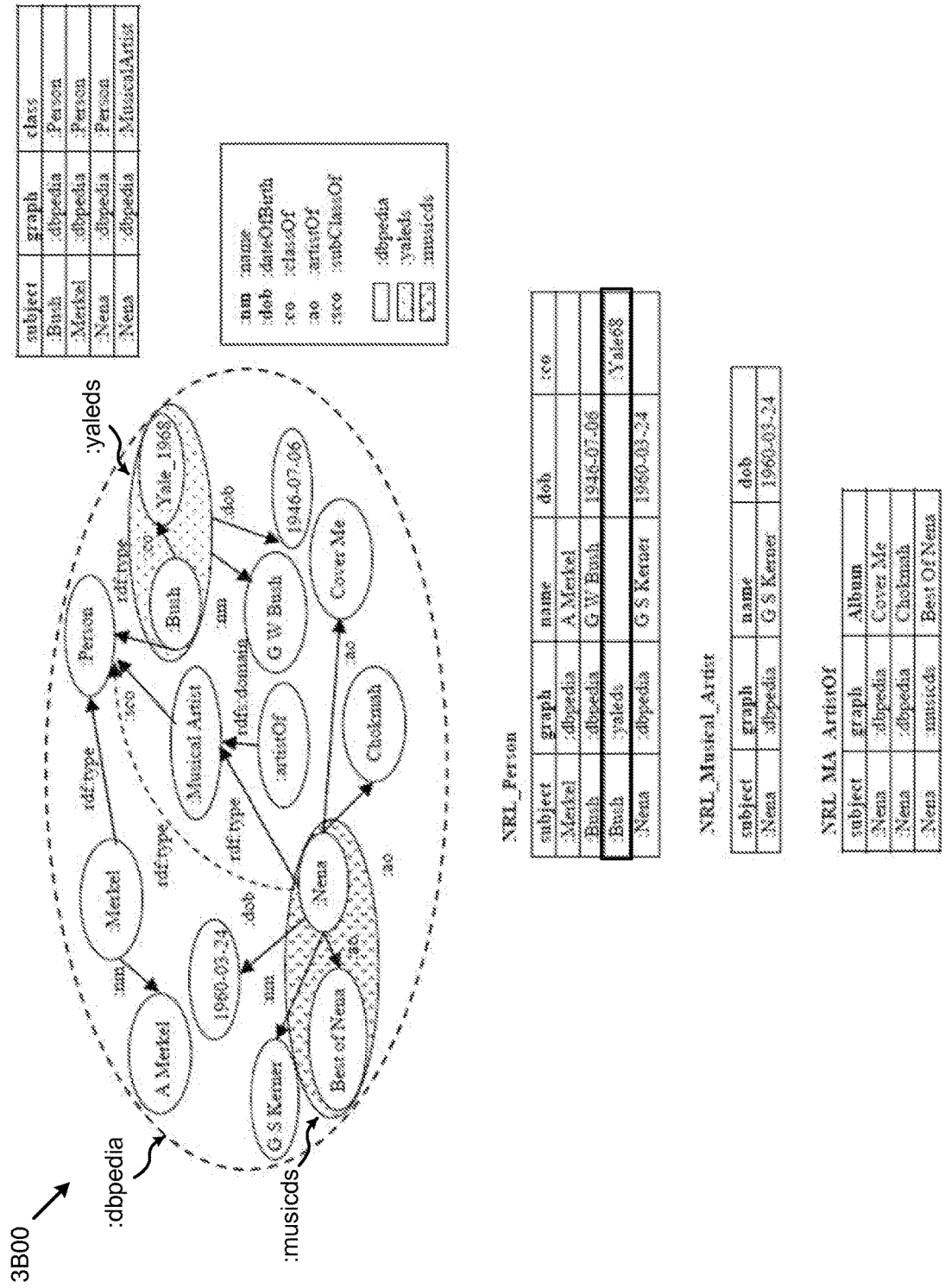
FIG. 3B is a diagram of a named graph aware relaxed variant transformation used in certain implementations for transforming RDF quads to relational views, according to some embodiments.

For RDF triples, the mapping of RDF to relations can be described as mapping class to a relation (relational view) and property to a column, such that a single valued-property forms a column of a class view and each multi-valued property forms its own separate property view. However, for RDF quads, the RDF triple mapping scheme is extended to include the fourth component that extends a triple into a quad. This component typically represents context, provenance, or version of the graph. FIG. 3B (near the top-left) shows a sample RDF quad dataset consisting of three named graphs indicated by the three different patterns. In this example, the named graph component characterizes the provenance information.

One possibility for an extension of the RDF triple transformation in the presence of the fourth component is to scope the determination of class instances and property occurrences to a single graph. This view definition is referred to as "named-graph strict variant" (NS) (refer to FIG. 2). Views with the prefix "NSL", as shown in FIG. 3A, presents the property class view NSL_Person 3A02 and NSL_Musical Artist 3A04 corresponding to class :Person and :MusicalArtist containing all single valued properties, and a property view NSL MA ArtistOf 3A06 corresponding to the multi-valued property. Notice that the additional triples asserted in :yaleds and :musicds do not appear in these views as those named graphs do not contain rdf:type assertion for those subjects.

FIG. 3B is a diagram of a named graph aware relaxed variant transformation 3B00 used in certain implementations for transforming RDF quads to relational views. As an option, the present named graph aware relaxed variant transformation 3B00 may be implemented in the context of the architecture and functionality of the embodiments described herein. Also, the named graph aware relaxed variant transformation 3B00 or any aspect therein may be implemented in any desired environment.

For cases where the rdf:type for a subject is asserted in one graph, and the properties that co-occur for a subject are asserted in another graph, a "named-graph relaxed variant" (NR) is applicable. A named-graph relaxed variant can be constructed when an rdf:type assertion for a subject is present anywhere in the dataset. For example, for :Bush, the rdf:type triple is present in :dbpedia, and the property :classOf is present in :yaleds graph. The NRL_Person view definition corresponds to a relaxed variant (view with prefix NRL in FIG. 3B) and includes an additional row for the property asserted in the :yaleds named graph. Similarly, the NRL MA ArtistOf view includes an additional row for property asserted in the :musicds named graph.

For both NS and NR variants, the composite (graph, subject) key forms the primary key in the corresponding property class view. That is, there could be multiple rows per subject corresponding to properties occurring in different named graphs. For example, :Bush has two rows, one for each named graph, :dbpedia and :yaleds in corresponding RL_Person view.

Figure 3C:
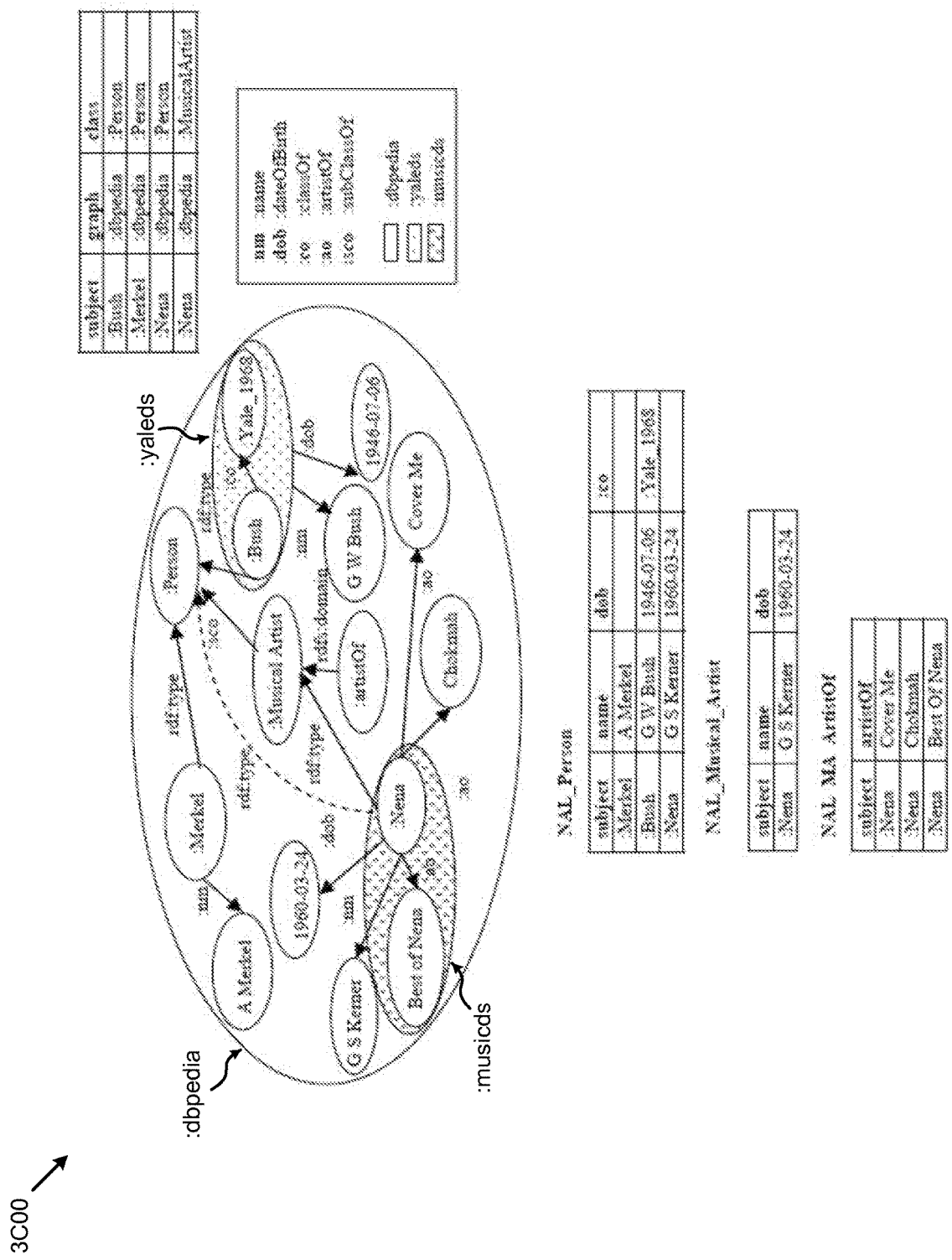
FIG. 3C is a diagram of a named graph agnostic transformation used in certain implementations for transforming RDF quads to relational views, according to some embodiments.

FIG. 3C is a diagram of a named graph agnostic transformation 3C00 used in certain implementations for transforming RDF quads to relational views. As an option, the present named graph agnostic transformation 3C00 may be implemented in the context of the architecture and functionality of the embodiments described herein. Also, the named graph agnostic transformation 3C00 or any aspect therein may be implemented in any desired environment.

Examples of the NS variants examples of the NR variants are discussed in the foregoing FIG. 3A and FIG. 3B. An additional variant is to ignore the graph name component altogether in transformation to relational views. Referring again to FIG. 2, the view definition corresponding to this is referred to as "named-graph agnostic variant" (NA) (see views with prefix NAL) and shows the agnostic variant for the same dataset. In this transformation, the graph names are ignored and certain exemplary embodiments eliminate duplicate triples (NALI) in order to preserve set semantics. Other certain exemplary embodiments result in transformations with duplicates intact (NALD).

Figure 4:
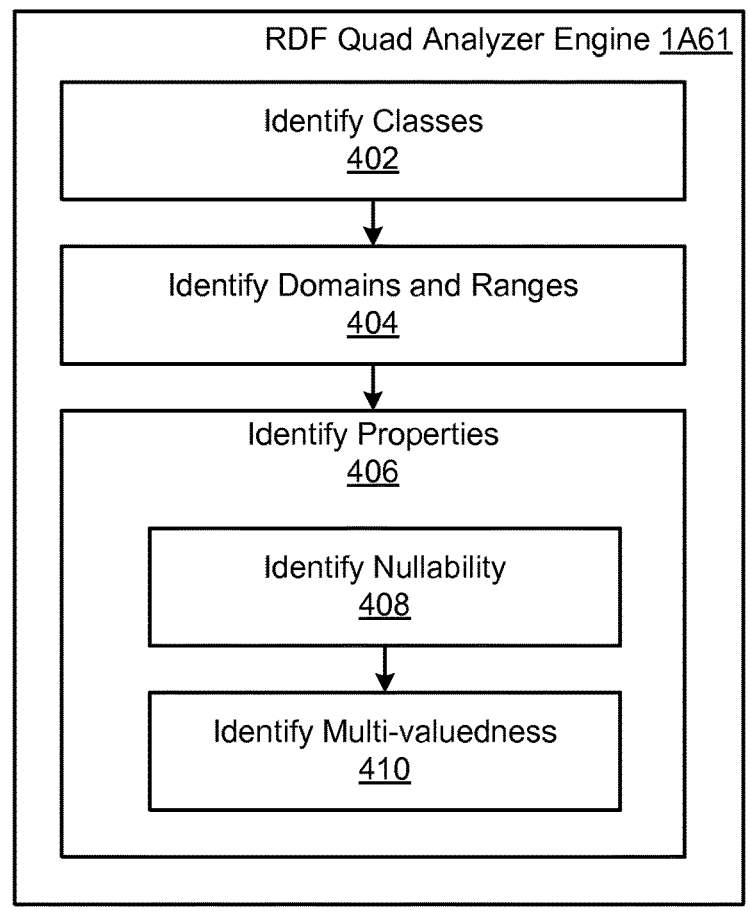
FIG. 4 shows a set of process steps performed by an RDF quad analyzer engine used in systems for transforming RDF quads to relational views, according to some embodiments.

FIG. 4 shows a set of process steps 400 performed by an RDF quad analyzer engine used in systems for transforming RDF quads to relational views. As an option, the present process steps 400 may be implemented in the context of the architecture and functionality of the embodiments described herein. Also, the process steps 400 or any aspect therein may be implemented in any desired environment.

Some embodiments implement an RDF quad analyzer engine 1A61, and such an engine can perform operations to identify classes (see operation 402), identify domains and ranges (see operation 404), and identify properties (see operation 406). Property identification can include operations to identify characteristics of nullability (see operation 408), and operations to identify characteristics of multi-valuedness (see operation 410). Each of these operations are now discussed in the following paragraphs.

Identifying classes. The set of classes that have at least one instance is bound to the variable c in '{{GRAPH ?g{?s rdf:type ?c}} UNION {?s rdf:type ?c}}'. The pattern matches classes from both named and unnamed graphs.

Identifying domain/range. An asserted domain for a property is bound to each pair of variables (?d, ?p) in '?d rdfs:domain ?p'. Similarly, asserted range for a property is bound to (?r, ?p) from '?r rdfs:range ?p'.

For a derived domain, apply the graph pattern '{GRAPH ?g {?s rdf:type ?c . ?s ?p ?o}}. FILTER (?p !=rdf:type)'. Property domains are bounded into variable pair (?c, ?p).

For derived range, apply the graph pattern '{GRAPH ?g {?o rdf:type ?c . ?s ?p ?o}}. FILTER (?p !=rdf:type)'. Property ranges are also bounded into variable pair (?c, ?p).

If the typed literal is consistent (e.g., comprising only one type) for all values of ?o, then the typed literal range is stored for the property.

Identifying properties. Given the set of domain and properties identified previously, the nullability and the multi-valuedness characteristics of a property is determined based on the cardinality of its values per instance. For example, if the max(cardinality) of an object when grouped by (graph, class, instance, property) is greater than 1, the property is deemed multi-valued. Similarly, if the min(cardinality) of an object when grouped by (graph, class, instance, property) is less than 1, the property is deemed nullable.

Figure 5:
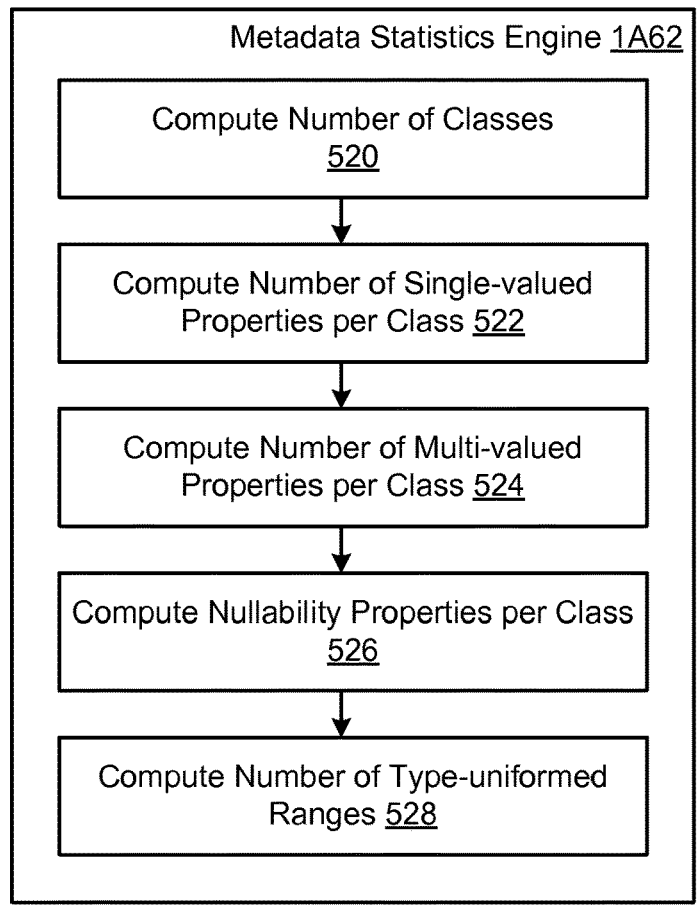
FIG. 5 shows a set of process steps performed by a metadata statistics engine used in systems for transforming RDF quads to relational views, according to some embodiments.

FIG. 5 shows a set of process steps 500 performed by a metadata statistics engine used in systems for transforming RDF quads to relational views. As an option, the present process steps 500 may be implemented in the context of the architecture and functionality of the embodiments described herein. Also, the process steps 500 or any aspect therein may be implemented in any desired environment.

Some embodiments implement a metadata statistics engine 1A62, and such an engine can perform operations to compute a number of classes (see operation 520), compute a number of single-valued properties per class (see operation 522), compute a number of multi-valued properties per class (see operation 524), compute nullability properties per class (see operation 526), and compute a number of type-uniformed ranges (see operation 528). Each of these operations are now discussed in the following paragraphs.

In exemplary embodiments, all single-valued properties of a class are mapped to columns of a class view. Each pair selected from a set of enumerated pairs of class and its multi-valued property is mapped to a separate multi-valued property view. And, the nullability characteristic of a property per class is used for reducing the number of OPTIONAL clauses in the graph pattern that forms the basis for computing column values for the view. When the property ranges of instances of a class are uniform, that is, a single typed literal, the property value can be cast to the appropriate column data type in the view.

After the steps for generating metadata (e.g., see the metadata outputs of the RDF quad analyzer engine 1A61), statistical information about the dataset is generated. Strictly as an example, a metadata statistics engine 1A62 can be employed to produce statistics such as:

Number of classes: If the number of classes is large, then the user may want to select a subset of classes to generate views.

Number of single-valued properties per class: These properties become columns in the corresponding view of the class. A user might not be interested in each and every one of the columns, and thus may want to select a limited number of columns to be published in the views.

Number of multi-valued properties per class: Each multi-valued property is mapped to a separate view. Knowledge of the number of multi-valued properties helps to enumerate the exact number of possible views that can be generated.

Number of nullable properties per class: Each nullable property appears as an OPTIONAL clause in the graph pattern for the corresponding class view.

Number of type-uniformed ranges: This number determines the number of casting expressions that appear in the views.

Figure 6:
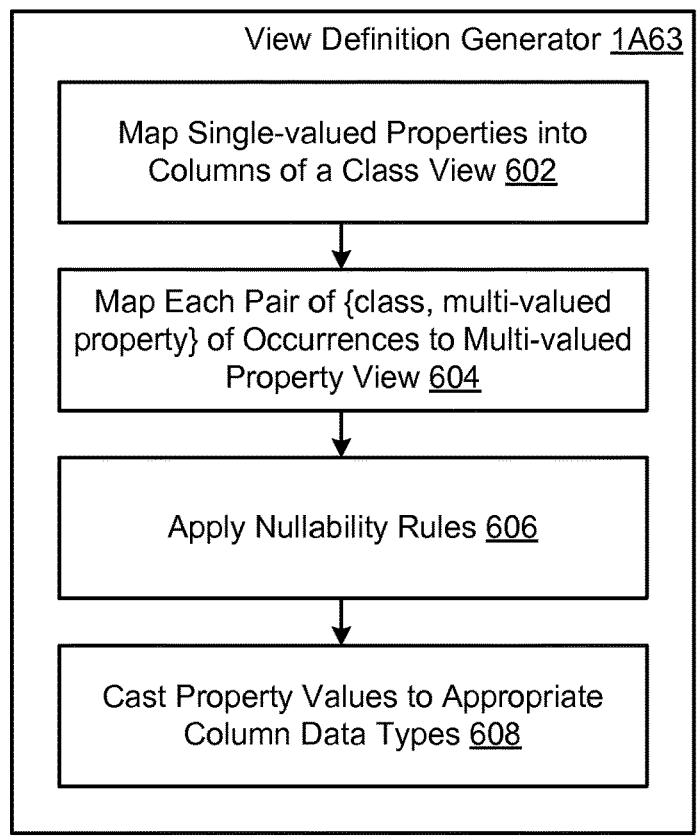
FIG. 6 shows a set of process steps performed by a view generator engine used in systems for transforming RDF quads to relational views, according to some embodiments.

FIG. 6 shows a set of process steps 600 performed by a view generator engine used in systems for transforming RDF quads to relational views. As an option, the present process steps 600 may be implemented in the context of the architecture and functionality of the embodiments described herein. Also, the process steps 600 or any aspect therein may be implemented in any desired environment.

The view definition generator 1A63 is comprised of several operational elements to perform view definition generation operations. As shown, an operation to map single-valued properties into columns of a class view (see operation 602) is followed by an operation to map each pair of {class, multi-valued property} of occurrences to multi-valued property view (see operation 604). A view definition generator 1A63 might also apply nullability rules (see operation 606) and cast property values to appropriate column data types (see operation 608). The order of the operations as shown is purely exemplary, and other orders of succession are also reasonable and envisioned.

Given a set of classes and properties obtained as described supra, the following paragraphs explain how a set of views are generated (see Algorithm 1).

| ALGORITHM 1: GEN_VIEWS(DS_ID) |
| --- |
| 1: for each class c in C |
| 2:    get the list of single properties $P_s(c)$ |
| 3:    view_name = get_view_name(c) |
| 4:    wc := '{graph ?g{ ?i rdf:type <' + c + '> '; |
| 5:    sc := 'g, i'; |
| 6:    vc := 'create view ' + view_name + '(graph, instance'; |
| 7:    for each property $p_s$ in $P_s(c)$ |
| 8:       rel_name := get_rel_name($p_s$); |
| 9:       vc := vc + ', ' + rel_name ; |
| 10:       if is_nullable($p_s$) then |
| 11:          wc := wc + ' . OPTIONAL {?i <' + $p_{s\ +}$ '> ?' + rel_name; + '}'; |
| 12:       else |
| 13:          wc := wc + ' . ?i <' + $p_s$ '> + ' ?' + rel_name; |
| 14:       end if; |
| 15:       if is_castable ($p_s$) then |
| 16:          type := get_type(c, $p_s$); |
| 17:          sc := sc + ', ' + cast(rel_name, type) + ' ' + rel_name; |
| 18:       else |
| 19:          sc := sc + ', ' + rel_name; |
| 20:       end if; |
| 21:    end for; |
| 22:    vc := vc + ')'; |
| 23:    wc := wc + '} }'; |
| 24:    view_ddl := vc + ' as select ' + sc + ' from ds_id where ' + wc |
| 25:    store view_ddl; {class view} |
| 26:    for each property $p_m$ in $P_M(c)$ |
| 27:       rel_name := get_rel_name($p_m$); |
| 28:       view_name := get_view_name(c, $p_m$); |
| 29:       vc := 'create view ' + view_name + '(graph, instance' + rel_name + ')'; |
| 30:          wc := '{graph ?g{ ?i rdf:type <' + c + '> '; |
| 31:          wc := wc + '. ?i <' + $p_m$ + '> ?' + rel_name + '}}'; |
| 32:       if is_castable ($p_m$) then |
| 33:          type := get_type(c, $p_m$); |
| 34:          sc := 'g, i, ' + cast(rel_name, type) + ' ' + rel_name; |
| 35:       else |
| 36:          sc := 'g, I, ' + rel_name; |
| 37:       end if; |
| 38:       view_ddl := vc + ' as select ' + sc + ' from ds_id where ' + wc; |
| 39:       store view_ddl; {property view} |
| 40:    end for; |
| 41: end for; |

Algorithm 1 commences by getting the set of classes in the dataset ds_id. For each class found, the algorithm constructs two types of view definitions: one class view (line 25 of Algorithm 1) and (possibly multiple) property view (line 38 of Algorithm 1). In the first for loop (line 7 of Algorithm 1), it goes over the set of single-valued properties identified for class c and constructs the substrings for view columns (vc), select clause (sc), and a graph pattern for where clause (wc). If the property is identified as nullable, it will be labeled as OPTIONAL in the graph pattern of this view definition (line 11 of Algorithm 1). A casting operation (e.g., cast (rel_name, type)) is performed for cells of columns that have a uniform literal range (line 17 of Algorithm 1). The sample query using SEM_MATCH below shows the SEM_APIS.GETV$DATETZVAL function that returns the value of date, or NULL if it does not comply with the format.

In the second for loop (line 26 of Algorithm 1), if class c has multi-valued properties $p_1, \ldots p_k$, then one separate property view (c, $p_i$), i=1 ... k is created for a combination of one multi-value property $p_i$ and class c.

Publishing Relational Views

The relational views shown in FIG. 3A through FIG. 3C correspond to generating views after expanding the original data to include inferred triples/quads. For example, the :subClassOf triple, allows the inference that (:Nena, rdf:type, :Person). A user can alternately decide to publish views over the original dataset (that is, without entailing it), in which case the row corresponding to :Nena will not appear in the various variants of Person views. By default, the lexical value-based views are published, which are denoted by the prefixes "NSL", "NRL", "NAL", and "NALD" respectively.

The underlying RDF stores the quads as IDQuads and LexicalValues tables, and corresponding ID-based views can be published. That is, for cases where the lexical values are not needed (e.g., since its equivalent IDs are sufficient) it is permissible to publish the corresponding ID-based views. These view variants, denoted by the prefixes NSI, NRI, NAI, and NAID respectively (again, see FIG. 2), can return results by querying IDQuads tables only without requiring additional joins with any LexicalValues table.

Goodness Factors

Now, returning to the discussion of FIG. 1A, a transformation scorer 1A69 can be employed to assess various qualities of a transformation. Two measures are of interest are:

Overall transformation factor, and
    Overall NULL presence factor.

In the relaxed variant of FIG. 3B, for example, the overall transformation factor is 15/17 since 15 out of 17 triples are covered by the views. The triples not covered are {(:Person, rdfs:subClassOf, :MusicalArtist), (:artistOf, rdfs:domain, :MusicalArtist)}. The NULL presence factor for relaxed variants of views is the number of null cells over total number of cells in views, that is, 6/(20+4+9)=0.27.

Handling Special Cases

Handling Duplicates. Duplicates can occur when considering data across multiple graphs to perform aggregate queries in gathering metadata and to publish views. Two sample scenarios for duplicates are:

Two or more named graphs store different versions of RDF quads. Typically, the later version of data subsumes the previous version.

Two named graphs may overlap on some classes, say :dbpedia_2011 and :dbpedia_2012 both have class :Person in common. If the graph name is ignored (NA), the view of class :Person may contain duplicate rows.

Handling Generation of OPTIONAL Clause. The OPTIONAL clause in SPARQL allows a part of a graph pattern to optionally match a triple and return variables. This operator is useful to query RDF datasets that are sparse in structure. This is extensively used in the view definitions to collect all possible property values from a class instance that constitute a row of a view. For example, an instance of the class :Person may have an asserted :dob (date of birth), while another instance might not. By using the OPTIONAL clause as shown later it is possible to locate all Person instances together with their dob when asserted in the RDF store. One approach is to pre-determine all the triple patterns to be optional by computing the nullability for each (class, property) pair. All properties of a class are assumed to be mandatory unless the property is missing from at least one instance of that class.

Handling Named and Unnamed Graphs. A triple store may support both named and unnamed graphs. For such cases, some embodiments split the query into two clauses, one for named graphs and one for unnamed graphs, and then union all the result sets. For example, in the view definition query, all the named graphs are assumed to be NOT NULL.

This can be applied to triple stores that support a named graph as a default graph. In other cases the query needs to be modified to return the instances that do not have a graph component.

Handling Casting. Two approaches can be adopted to handle casting: by the entire column or by individual cells. The approach that casts by the entire column can cause an error if there is at least one value that does not comply with the data format. If the casting function can be applied to individual cells then, in operation, only that cell returns NULL if the value of that cell does not conform to the data format.

ADDITIONAL EMBODIMENTS OF THE DISCLOSURE

Figure 7:
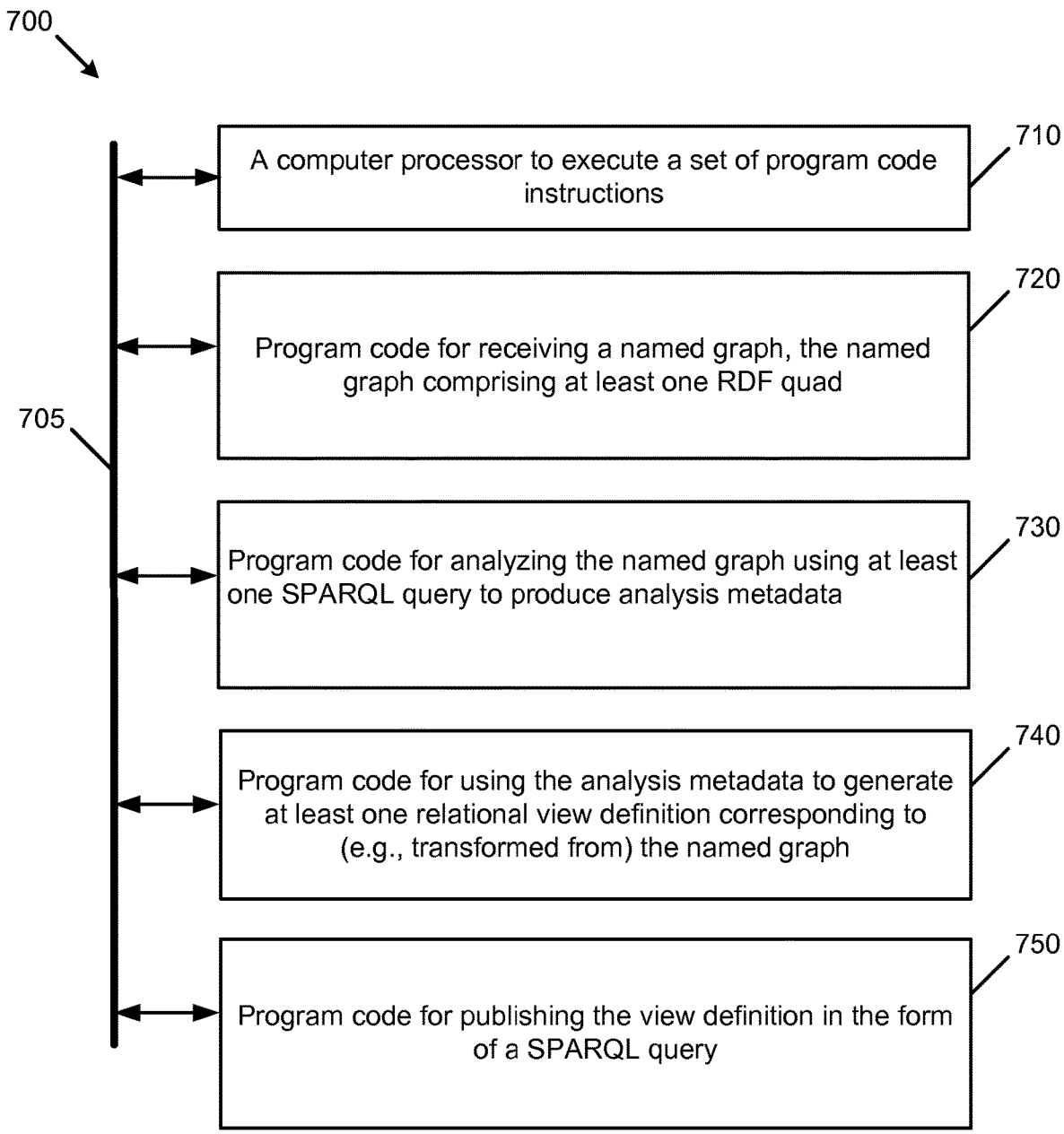
FIG. 7 depicts a block diagram of a system transforming RDF quads to relational views, according to some embodiments.

FIG. 7 depicts a block diagram of a system transforming RDF quads to relational views, according to some embodiments. As an option, the present system 700 may be implemented in the context of the architecture and functionality of the embodiments described herein. Of course, however, the system 700 or any operation therein may be carried out in any desired environment.

As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving a named graph, the named graph comprising at least one RDF quad (see module 720); analyzing the named graph using at least one SPARQL query to produce analysis metadata (see module 730); using the analysis metadata to generate at least one relational view definition corresponding to (e.g., transformed from) the named graph (see module 740); and publishing the relational view definition in the form of a SPARQL query (see module 750).

System Architecture Overview

Figure 8:
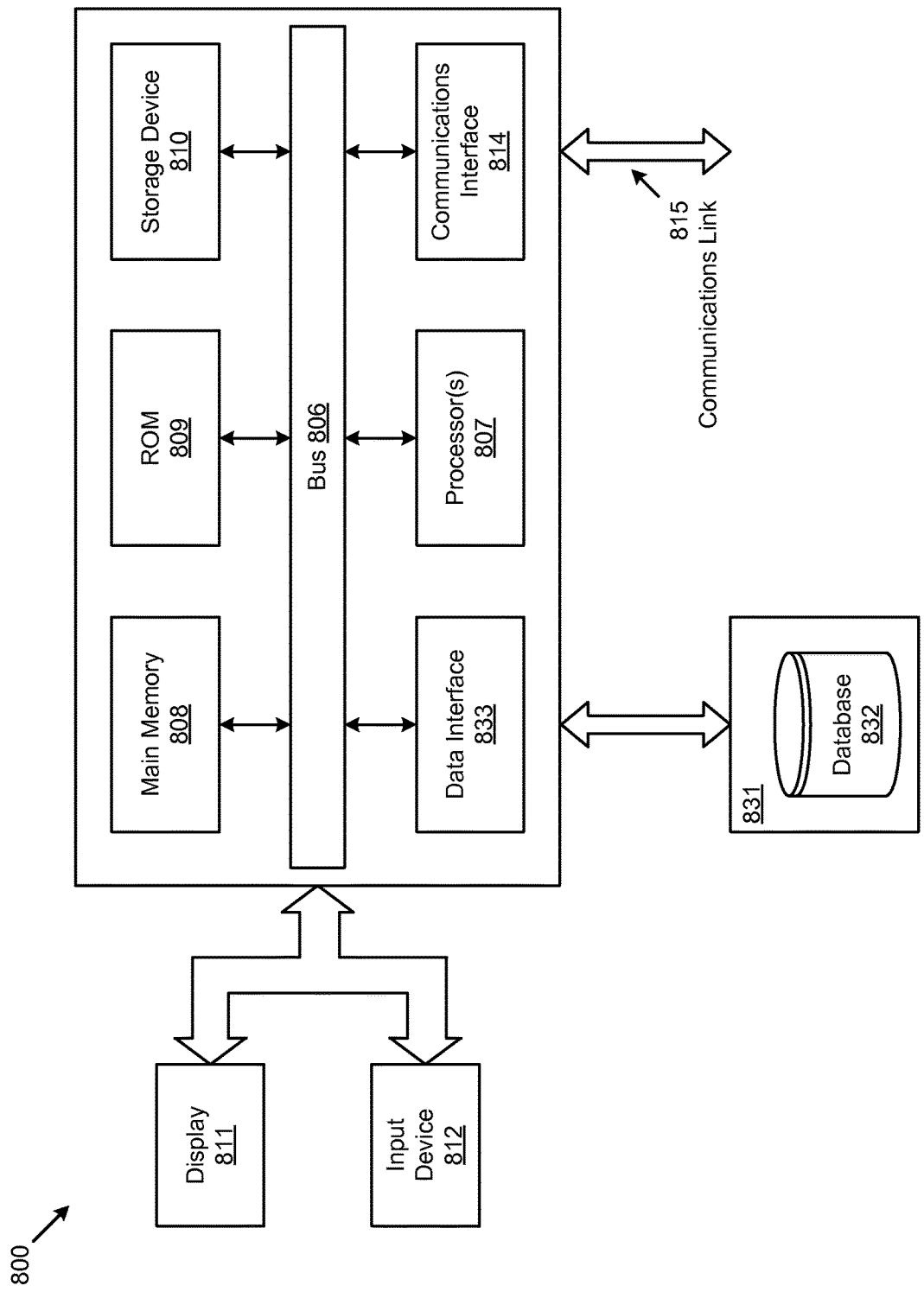
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to certain embodiments of the disclosure, two or more computer systems 800 coupled by a communications link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communications link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for generating relational database views for RDF (Resource Description Framework) quads, the computer implemented method comprising:

receiving, into a memory of a computing system, one or more named graphs, the one or more named graphs corresponding to a set of RDF quads;

selecting a scope from multiple scopes for generating a relational database view, wherein a respective scope of the multiple scopes is used to determine a respective number of named graphs to be considered in generating a corresponding relational database view from the set of RDF quads; and in response to selection of the scope, generating the relational database view from the set of RDF quads at least by:

determining analysis metadata indicative of a property that corresponds to the set of RDF quads at least by querying the set of RDF quads with at least one query;

determining a column structure for the relational database view for storing data from the one or more named graphs based at least in part upon the scope and the property corresponding to the set of RDF quads, wherein different scopes respectively correspond to different column structures; and transforming, using at least one microprocessor of the computing system, the set of RDF quads into the relational database view at least by populating data from the one or more named graphs into the column structure in the relational database view.

2. The computer implemented method of claim 1, wherein the multiple scopes correspond to respective restriction levels and comprise a first scope that is used to publish the set of RDF quads as a first relational database view with respect to no named graph, a second scope that is used to publish the set of RDF quads as a second relational database view with respect to a specific named graph in which the property is identified, and a third scope that is used to publish the set of RDF quads as a third relational database view with respect to a plurality of named graphs of the one or more named graphs.

3. The computer implemented method of claim 2, wherein the at least one query includes at least one SPARQL (Simple Protocol and RDF Query Language) query statement, and the used to determine whether the one or more RDF quads have at least one of a nullability characteristic, a single-valuedness characteristic, or a multi-valuedness characteristic.

4. The computer implemented method of claim 1, further comprising:

determining at least one relational view definition based at least in part upon the analysis metadata and the column structure; and presenting an RDF quad as an entry in the relational database view in a relational format.

5. The computer implemented method of claim 4, further comprising:

reducing a total number of resulting relational tables for transforming the set of RDF quads into the relational database view using at least the analysis metadata that is generated by querying the one or more named graphs with the at least one query.

6. The computer implemented method of claim 4, further comprising:

calculating a goodness score for presenting the RDF quad as the entry in the relational database view based at least in part upon the at least one relational view definition, wherein the goodness score is determined to represent a metric of transforming the set of RDF quads into the relational database view based at least in part upon a transformation factor and a null presence factor.

7. The computer implemented method of claim 6, further comprising at least one of:

publishing the at least one relational view definition in a form of a SPARQL query;

determining coverage of a transformation that presents the RDF quad of the set of RDF quads as the entry of the relational database view based at least in part upon the goodness score; or determining a relational view identifier for the at least one relational database view at least by processing a name associated with a first RDF quad into the relational view identifier, wherein the at least one relational view definition is generated as at least one of a named-graph strict variant, a named-graph relaxed variant, or a named-graph agnostic variant.

8. The computer implemented method of claim 1, wherein the different column structures comprises a first column structure for a single-valued property in a column, a second column structure for a pair of class and each of multiple property values of a multi-valued property in a respective column of a respective relational database view, and a third column structure that represents a nullable property as a clause in a graph pattern for a corresponding relational database view.

9. The computer implemented method of claim 1, further comprising:

identifying a schema for an RDF dataset including the set of RDF quads;

deriving at least one RDF quad attribute of the property at least by analyzing the schema for the set of RDF quads; and assessing a transformation that transforms the at least one RDF quad into one or more entries in the relational database view based in part or in whole upon the at least one RDF quad attribute.

10. The computer implemented method of claim 1, further comprising:

identifying at least one of a set of classes, a set of domains or ranges, or a set of properties; and computing at least one of a number of classes, a number of single-valued properties, a number of nullability properties, or a number of type-uniformed ranges.

11. A computer system for generating relational database views RDF (Resource Description Framework) quads, comprising:

at least one microprocessor of a computing system to execute a set of program code instructions; and a memory to hold the set of program code instructions which, when executed by the at least one microprocessor, causes the at least one microprocessor of the computing system at least to:

receive, into the memory of the computing system, one or more named graphs, the one or more named graphs corresponding to a set of RDF quads;

select a scope from multiple scopes for generating a relational database view, wherein a respective scope of the multiple scopes is used to determine a respective number of named graphs to be considered in generating a corresponding relational database view from the set of RDF quads; and in response to selection of the scope, generating the relational database view from the set of RDF quads at least by:

determining analysis metadata indicative of a property that corresponds to the set of RDF quads at least by querying the set of RDF quads with at least one query;

determining a column structure for the relational database view for storing data from the one or more named graphs based at least in part upon the scope and the property corresponding to the set of RDF quads, wherein different scopes respectively correspond to different column structures; and transforming, using the at least one microprocessor of the computing system, the set of RDF quads into the relational database view at least by populating data from the one or more named graphs into the column structure in the relational database view.

12. The computer system of claim 11, wherein the memory is to hold the set of program code instructions which, when executed by the at least one microprocessor, further causes the microprocessor of the computing system at least to:

determine at least one relational view definition based at least in part upon the analysis metadata and the column structure; and present an RDF quad as an entry in the relational database view in a relational format.

13. The computer system of claim 12, wherein the memory is to hold the set of program code instructions which, when executed by the at least one microprocessor, further causes the at least one microprocessor of the computing system at least to:

reduce a total number of resulting relational tables for transforming the set of RDF quads into the relational database view using at least the analysis metadata that is generated by querying the one or more named graphs with the at least one query.

14. The computer system of claim 11, wherein the memory is to hold the set of program code instructions which, when executed by the at least one microprocessor, further causes the at least one microprocessor of the computing system at least to:

identify a schema for an RDF dataset including the set of RDF quads;

derive at least one RDF quad attribute of the property at least by analyzing the schema for the set of RDF quads; and assess a transformation that transforms the at least one RDF quad into one or more entries in the relational database view based in part or in whole upon the at least one RDF quad attribute.

15. The computer system of claim 11, wherein the memory is to hold the set of program code instructions which, when executed by the at least one microprocessor, further causes the at least one microprocessor of the computing system at least to:

identify at least one of a set of classes, a set of domains or ranges, or a set of properties; and compute at least one of a number of classes, a number of single-valued properties, a number of nullability properties, or a number of type-uniformed ranges.

16. A computer program product embodied in a non-transitory computer readable medium having stored thereon a sequence of instructions which, when executed by at least one microprocessor, causes the at least one microprocessor to execute a set of acts to transform RDF quads to relational views, the set of acts comprising:

receiving, into a memory of a computing system, one or more named graphs, the one or more named graphs corresponding to a set of RDF quads;

selecting a scope from multiple scopes for generating a relational database view, wherein a respective scope of the multiple scopes is used to determine a respective number of named graphs to be considered in generating a corresponding relational database view from the set of RDF quads; and in response to selection of the scope, generating the relational database view from the set of RDF quads at least by:

determining analysis metadata indicative of a property that corresponds to the set of RDF quads at least by querying the set of RDF quads with at least one query;

determining a column structure for the relational database view for storing data from the one or more named graphs based at least in part upon the scope and the property corresponding to the set of RDF quads, wherein different scopes respectively correspond to different column structures; and transforming, using at least one microprocessor of the computing system, the set of RDF quads into the relational database view at least by populating data from the one or more named graphs into the column structure in the relational database view.

17. The computer program product of clam 16, wherein the non-transitory computer readable medium having stored thereon the sequence of instructions which, when executed by at least one microprocessor, further causes the at least one microprocessor to execute the set of acts that further comprises:

determining at least one relational view definition based at least in part upon the analysis metadata and the column structure; and presenting an RDF quad as an entry in the relational database view in a relational format.

18. The computer program product of clam 17, wherein the non-transitory computer readable medium having stored thereon the sequence of instructions which, when executed by at least one microprocessor, further causes the at least one microprocessor to execute the set of acts that further comprises:

reducing a total number of resulting relational tables for transforming the set of RDF quads into the relational database view using at least the analysis metadata that is generated by querying the one or more named graphs with the at least one query.

19. The computer program product of clam 17, wherein the different column structures comprises a first column structure for a single-valued property in a column, a second column structure for a pair of class and each of multiple property values of a multi-valued property in a respective column of a respective relational database view, and a third column structure that represents a nullable property as a clause in a graph pattern for a corresponding relational database view.

20. The computer program product of clam 17, wherein the multiple scopes correspond to respective restriction levels and comprise a first scope that is used to publish the set of RDF quads as a first relational database view with respect to no named graph, a second scope that is used to publish the set of RDF quads as a second relational database view with respect to a specific named graph in which the property is identified, and a third scope that is used to publish the set of RDF quads as a third relational database view with respect to a plurality of named graphs of the one or more named graphs.

* * * * *

UNITED STATES PATENT AND TRADEMARK OFFICE
CERTIFICATE OF CORRECTION

PATENT NO.         : 10,984,042 B2
APPLICATION NO.    : 15/652044
DATED              : April 20, 2021
INVENTOR(S)        : Srinivasan et al.

It is certified that error appears in the above-identified patent and that said Letters Patent is hereby corrected as shown below:

On the Title Page

On page 2, Column 1, item (56) under Other Publications, Line 7, delete "iswc2011 .semanticweb.org/" and insert -- iswc2011.semanticweb.org/ --, therefor.

On page 2, Column 2, item (56) under Other Publications, Line 25, delete "al.." and insert -- al. --, therefor.

On page 2, Column 2, item (56) under Other Publications, Line 30, delete "Exwcutable" and insert -- Executable --, therefor.

On page 2, Column 2, item (56) under Other Publications, Line 39, delete "Jounal" and insert -- Journal --, therefor.

On page 2, Column 2, item (56) under Other Publications, Line 39, delete "Semenatics," and insert -- Semantics, --, therefor.

On page 2, Column 2, item (56) under Other Publications, Line 68, delete "Databse"," and insert -- Database", --, therefor.

In the Specification

In Column 5, Line 20, delete ":musicalArtist" and insert -- :MusicalArtist --, therefor.

In the Claims

In Column 19, Line 37, in Claim 3, delete "the used" and insert -- used --, therefor.

In Column 22, Line 22, in Claim 17, delete "clam" and insert -- claim --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,984,042 B2

In Column 22, Line 33, in Claim 18, delete "clam" and insert -- claim --, therefor.

In Column 22, Line 44, in Claim 19, delete "clam" and insert -- claim --, therefor.

In Column 22, Line 53, in Claim 20, delete "clam" and insert -- claim --, therefor.